US011942060B2

(12) United States Patent
Choi et al.

(10) Patent No.: US 11,942,060 B2
(45) Date of Patent: Mar. 26, 2024

(54) DISPLAY APPARATUS AND METHOD OF DRIVING DISPLAY PANEL USING THE SAME

(71) Applicant: Samsung Display Co., Ltd., Yongin-si (KR)

(72) Inventors: Eunjin Choi, Yongin-si (KR); Wonjin Seo, Seoul (KR); Kihyun Pyun, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/201,837

(22) Filed: Mar. 15, 2021

(65) Prior Publication Data

US 2021/0287627 A1 Sep. 16, 2021

(30) Foreign Application Priority Data

Mar. 16, 2020 (KR) ........................ 10-2020-0031861

(51) Int. Cl.
*G09G 5/10* (2006.01)
*G09G 3/3291* (2016.01)

(52) U.S. Cl.
CPC ............. *G09G 5/10* (2013.01); *G09G 3/3291* (2013.01); *G09G 2310/0243* (2013.01); *G09G 2320/0257* (2013.01); *G09G 2330/028* (2013.01)

(58) Field of Classification Search
CPC ................... G09G 5/10; G09G 3/3291; G09G 2310/0243; G09G 2320/0257; G09G 2330/028
See application file for complete search history.

(56) References Cited

U.S. PATENT DOCUMENTS 9,778,524 B2 * 10/2017 You ...................... G09G 3/3659
2002/0027540 A1 * 3/2002 Lee ...................... G09G 3/3648 345/87
2006/0146005 A1 7/2006 Baba et al.
2007/0146291 A1 * 6/2007 Wang ................. G02F 1/13624 345/100

(Continued)

FOREIGN PATENT DOCUMENTS

KR 10-0206584 B1 7/1999
KR 10-0796787 B1 1/2008

(Continued)

OTHER PUBLICATIONS

EPO Extended European Search Report dated Jun. 4, 2021, issued in corresponding European Patent Application No. 21163002.5 (10 pages).

*Primary Examiner* — Amare Mengistu
*Assistant Examiner* — Jennifer L Zubajlo
(74) *Attorney, Agent, or Firm* — Lewis Roca Rothgerber Christie LLP

(57) ABSTRACT

A display apparatus includes: a display panel including: a gate line; a data line; and a pixel electrically connected to the gate line and the data line, and to display a normal image and a compensation image; a gate driver to output a gate signal to the gate line; a data driver to output a data voltage to the data line; and a power voltage generator to vary a level of a gate power voltage based on a compensation duty ratio corresponding to a ratio between a display duration of the normal image and a display duration of the compensation image.

19 Claims, 11 Drawing Sheets

(56) References Cited

U.S. PATENT DOCUMENTS

| | | | | |
|---|---|---|---|---|
| 2008/0079852 | A1* | 4/2008 | Nagaishi | H04N 9/312 348/739 |
| 2008/0238897 | A1* | 10/2008 | Kimura | H04N 5/66 345/204 |
| 2009/0160882 | A1* | 6/2009 | Kiya | G09G 3/2007 345/212 |
| 2010/0188320 | A1* | 7/2010 | Min | G09G 3/3291 345/80 |
| 2010/0188390 | A1* | 7/2010 | Min | G09G 3/3291 345/82 |
| 2011/0234911 | A1* | 9/2011 | Nakamura | G09G 3/3233 348/E5.119 |
| 2012/0086628 | A1* | 4/2012 | Ichioka | G02F 1/133603 345/102 |
| 2012/0086684 | A1* | 4/2012 | Ichioka | G09G 3/3406 345/207 |
| 2013/0321365 | A1* | 12/2013 | Chang | G09G 3/3674 345/204 |
| 2016/0042713 | A1* | 2/2016 | Sim | G09G 3/3674 345/87 |
| 2016/0078830 | A1* | 3/2016 | Huang | G09G 3/3406 345/691 |
| 2016/0275870 | A1* | 9/2016 | Kimura | G09G 3/3258 |
| 2017/0038894 | A1* | 2/2017 | Jeong | G06F 3/0412 |
| 2018/0061352 | A1* | 3/2018 | Kim | G09G 3/3696 |
| 2018/0108321 | A1* | 4/2018 | Oh | G09G 3/3685 |
| 2018/0315369 | A1* | 11/2018 | Pyun | G09G 3/3677 |
| 2019/0005907 | A1* | 1/2019 | Koo | G09G 3/3607 |
| 2019/0371236 | A1* | 12/2019 | Sakai | G09G 3/3233 |
| 2019/0371237 | A1* | 12/2019 | Qian | G09G 3/3266 |
| 2020/0184892 | A1* | 6/2020 | Yang | G09G 3/3258 |
| 2021/0201840 | A1* | 7/2021 | Shang | G09G 3/3696 |
| 2021/0272505 | A1* | 9/2021 | Kim | G09G 3/36 |

FOREIGN PATENT DOCUMENTS

| | | | |
|---|---|---|---|
| KR | 10-2008-0046987 | A | 5/2008 |
| KR | 10-1415062 | B1 | 7/2014 |
| KR | 10-2017-0060662 | A | 6/2017 |
| KR | 10-2018-0060530 | A | 6/2018 |
| WO | 2019/029174 | A1 | 2/2019 |

* cited by examiner

DISPLAY APPARATUS AND METHOD OF DRIVING DISPLAY PANEL USING THE SAME

CROSS-REFERENCE TO RELATED APPLICATION

This application claims priority to and the benefit of Korean Patent Application No. 10-2020-0031861, filed on Mar. 16, 2020, in the Korean Intellectual Property Office (KIPO), the entire content of which is incorporated by reference herein.

BACKGROUND

1. Field

Aspects of example embodiments of the present disclosure relate to a display apparatus, and a method of driving a display panel using the display apparatus. More particularly, example embodiments of the present disclosure relate to a display apparatus for enhancing a display quality, and a method of driving a display panel using the display apparatus.

2. Description of the Related Art

Generally, a display apparatus includes a display panel and a display panel driver. The display panel includes a plurality of gate lines, a plurality of data lines, a plurality of emission lines, and a plurality of pixels. The display panel driver includes a gate driver, a data driver, an emission driver, and a driving controller. The gate driver outputs gate signals to the gate lines. The data driver outputs data voltages to the data lines. The emission driver outputs emission signals to the emission lines. The driving controller controls the gate driver, the data driver, and the emission driver.

When the display panel displays a moving image (e.g., a movie image), an afterimage of a previous frame image may be generated so that the image may be displayed as if dragged. To reduce or prevent the afterimage, a black image may be inserted between frame images. However, when the black image is inserted between the frame images, a charging rate may decrease due to insufficient charging time of the frame image.

The above information disclosed in this Background section is for enhancement of understanding of the background of the present disclosure, and therefore, it may contain information that does not constitute prior art.

SUMMARY

One or more example embodiments of the present disclosure are directed to a display apparatus for varying a gate power voltage based on a duty ratio of a compensation image to enhance a display quality.

One or more example embodiments of the present disclosure are directed to a method of driving the display panel using the display apparatus.

According to one or more example embodiments of the present disclosure, a display apparatus includes: a display panel including: a gate line; a data line; and a pixel electrically connected to the gate line and the data line, and configured to display a normal image and a compensation image; a gate driver configured to output a gate signal to the gate line; a data driver configured to output a data voltage to the data line; and a power voltage generator configured to vary a level of a gate power voltage based on a compensation duty ratio corresponding to a ratio between a display duration of the normal image and a display duration of the compensation image.

In an example embodiment, the gate power voltage may be a first gate power voltage corresponding to a high level of the gate signal.

In an example embodiment, the compensation duty ratio may be a ratio of the display duration of the compensation image to a sum of the display duration of the normal image and the display duration of the compensation image, and the power voltage generator may be configured to increase the first gate power voltage as the compensation duty ratio increases.

In an example embodiment, the gate power voltage may be a second gate power voltage corresponding to a low level of the gate signal.

In an example embodiment, the compensation duty ratio may be a ratio of the display duration of the compensation image to a sum of the display duration of the normal image and the display duration of the compensation image, and the power voltage generator may be configured to decrease the second gate power voltage as the compensation duty ratio increases.

In an example embodiment, the normal image may be displayed based on grayscale data of input image data, and the compensation image may be displayed regardless of the grayscale data of the input image data.

In an example embodiment, the compensation image may be a black image.

In an example embodiment, the display apparatus may further include a driving controller configured to control an operation of the gate driver and an operation of the data driver. The driving controller may include: a compensation image insertion enable determiner configured to enable and disable a compensation image insertion; and a compensation duty ratio determiner configured to determine the compensation duty ratio, and output the compensation duty ratio to the power voltage generator, when the compensation image insertion is enabled.

In an example embodiment, the power voltage generator may be configured to vary the level of the gate power voltage based on the compensation duty ratio and a luminance weight for varying a luminance of input image data according to the compensation duty ratio.

In an example embodiment, the luminance weight may be increased when the compensation duty ratio increases.

In an example embodiment, the gate power voltage may be a first gate power voltage corresponding to a high level of the gate signal.

In an example embodiment, the compensation duty ratio may be a ratio of the display duration of the compensation image to a sum of the display duration of the normal image and the display duration of the compensation image, the power voltage generator may be configured to increase the first gate power voltage as the compensation duty ratio increases, and the power voltage generator may be configured to increase the first gate power voltage as the luminance weight increases.

In an example embodiment, the gate power voltage may be a second gate power voltage corresponding to a low level of the gate signal.

In an example embodiment, the compensation duty ratio may be a ratio of the display duration of the compensation image to a sum of the display duration of the normal image and the display duration of the compensation image, the power voltage generator may be configured to decrease the second gate power voltage as the compensation duty ratio increases, and the power voltage generator may be configured to decrease the second gate power voltage as the luminance weight increases.

In an example embodiment, the display apparatus may further include a driving controller configured to control an operation of the gate driver and an operation of the data driver. The driving controller may include: a compensation image insertion enable determiner configured to enable and disable a compensation image insertion; a compensation duty ratio determiner configured to determine the compensation duty ratio, and output the compensation duty ratio to the power voltage generator, when the compensation image insertion is enabled; a luminance weight enable determiner configured to enable and disable applying of the luminance weight; and a luminance weight determiner configured to determine the luminance weight, and output the luminance weight to the power voltage generator, when the applying of the luminance weight is enabled.

According to one or more example embodiments of the present disclosure, a method of driving a display panel, includes: determining a level of a gate power voltage based on a compensation duty ratio corresponding to a ratio between a display duration of a normal image and a display duration of a compensation image; generating a gate signal based on the gate power voltage; outputting the gate signal to a gate line; and outputting a data voltage to a data line based on input image data.

In an example embodiment, the gate power voltage may be a first gate power voltage corresponding to a high level of the gate signal, the compensation duty ratio may be a ratio of the display duration of the compensation image to a sum of the display duration of the normal image and the display duration of the compensation image, and the first gate power voltage may be increased as the compensation duty ratio increases.

In an example embodiment, the gate power voltage may be a second gate power voltage corresponding to a low level of the gate signal, the compensation duty ratio may be a ratio of the display duration of the compensation image to a sum of the display duration of the normal image and the display duration of the compensation image, and the second gate power voltage may be decreased as the compensation duty ratio increases.

In an example embodiment, the normal image may be displayed based on grayscale data of the input image data, and the compensation image may be displayed regardless of the grayscale data of the input image data.

In an example embodiment, the level of the gate power voltage may be determined based on the compensation duty ratio and a luminance weight for varying a luminance of the input image data according to the compensation duty ratio.

According to one or more example embodiments of the present disclosure, in the display apparatus and the method of driving the display panel, a compensation image may be inserted between normal images so that an image drag due to an instantaneous afterimage, which may occur due to a moving picture response time, may be prevented or substantially prevented.

In addition, according to one or more example embodiments of the present disclosure, a gate power voltage may be varied based on the duty ratio of the compensation image so that a decrease of a charging rate of the normal image and a display defect due to the decrease of the charging rate may be prevented or substantially prevented when the compensation image is inserted between the normal images. The charging rate of the normal image may be compensated so that the display quality of the display panel may be enhanced.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Figure 1:
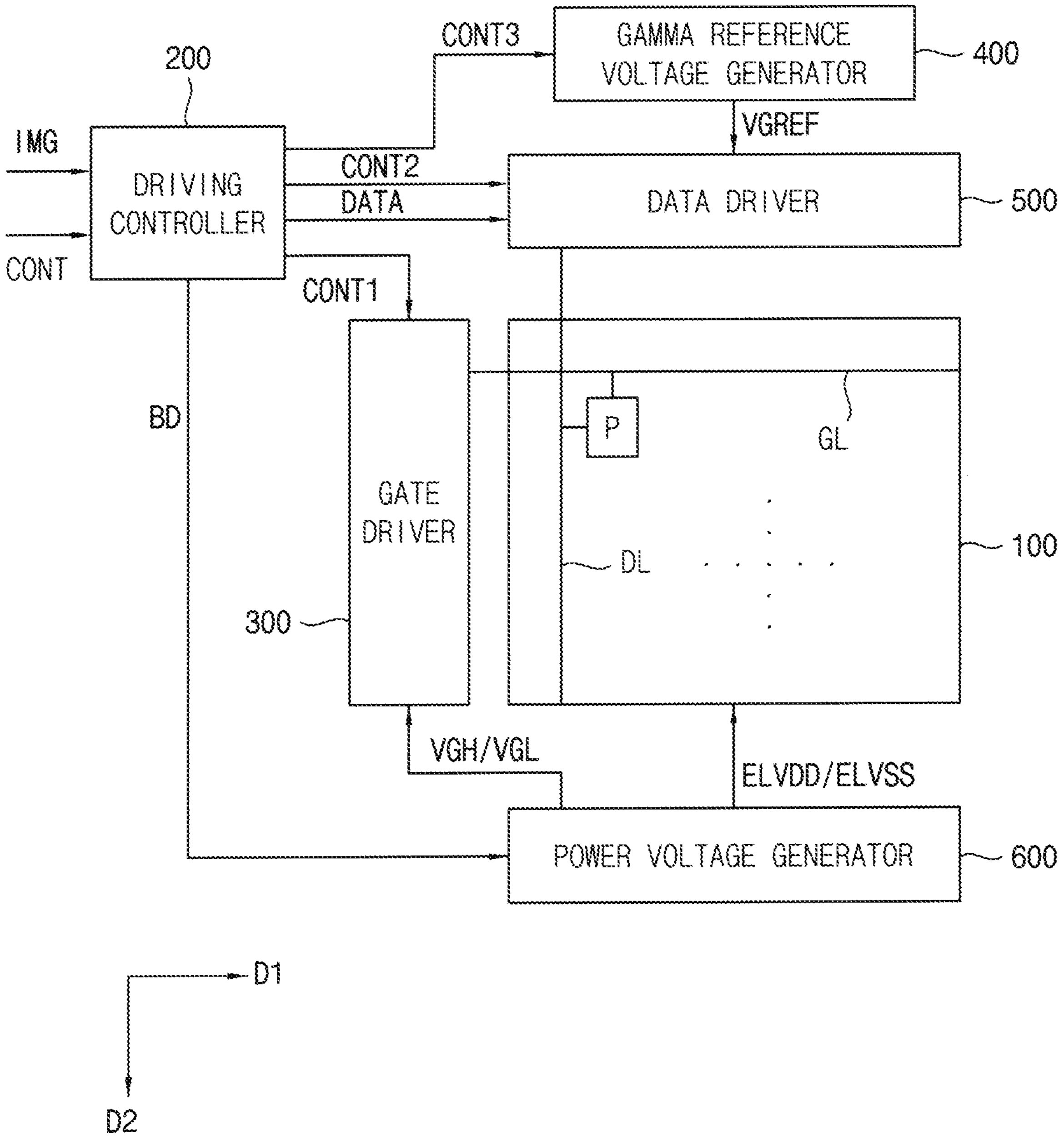
FIG. 1 is a block diagram illustrating a display apparatus according to an example embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices (e.g., the driving controller, the gamma reference voltage generator, the data driver, the bi enable determiner, the bi duty determiner, the luminance weight enable determiner, the luminance weight determiner, and/or the like) and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display apparatus according to an example embodiment of the present disclosure.

Referring to FIG. 1, the display apparatus includes a display panel 100, and a display panel driver. The display panel driver includes a driving controller (e.g., a timing controller) 200, a gate driver (e.g., a scan driver) 300, a gamma reference voltage generator 400, and a data driver 500. The display panel driver further includes a power voltage generator 600.

In some embodiments, for example, the driving controller 200 and the data driver 500 may be integrally formed with each other. In some embodiments, for example, the driving controller 200, the gamma reference voltage generator 400, and the data driver 500 may be integrally formed with each other. A driving module including at least the driving controller 200 and the data driver 500, which may be integrally formed with each other, may be referred to as a timing controller embedded data driver (TED).

The display panel 100 has a display region at (e.g., in or on) which an image is displayed, and a peripheral region adjacent to the display region. For example, the peripheral region may at least partially surround (e.g., around a periphery of) the display region.

The display panel 100 includes a plurality of gate lines GL, a plurality of data lines DL, and a plurality of pixels P connected to the gate lines GL and the data lines DL. The gate lines GL extend in a first direction D1, and the data lines DL extend in a second direction D2 crossing the first direction D1.

In the present example embodiment, the display panel 100 may be an organic light emitting display panel including an organic light emitting element. However, the present disclosure is not limited thereto, and in another example embodiment, the display panel 100 may be a liquid crystal display panel including a liquid crystal molecule.

The driving controller 200 receives input image data IMG and an input control signal CONT from an external apparatus. In some embodiments, the input image data IMG may include red image data, green image data, and blue image data. In some embodiments, the input image data IMG may include white image data. In some embodiments, the input image data IMG may include magenta image data, yellow image data, and cyan image data. The input control signal CONT may include a master clock signal and a data enable signal. In some embodiments, the input control signal CONT may further include a vertical synchronizing signal and a horizontal synchronizing signal.

The driving controller 200 generates a first control signal CONT1, a second control signal CONT2, a third control signal CONT3, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals for driving the gate lines GL in response to the first control signal CONT1 received from the driving controller 200. The gate driver 300 outputs the gate signals to the gate lines GL. For example, the gate driver 300 may sequentially output the gate signals to the gate lines GL. In some embodiments, for example, the gate driver 300 may be integrated on the display panel 100. For example, the gate driver 300 may be mounted on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF may have a value corresponding to a level of the data signal DATA.

In an example embodiment, the gamma reference voltage generator 400 may be disposed at (e.g., in or on) the driving controller 200, or at (e.g., in or on) the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a power voltage for driving at least one of the display panel 100, the driving controller 200, the gate driver 300, the gamma reference voltage generator 400, and the data driver 500.

For example, the power voltage generator 600 may output a first pixel power voltage ELVDD and a second pixel power voltage ELVSS, which are applied to the pixels P of the display panel 100, to the display panel 100.

For example, the power voltage generator 600 may generate a gate power voltage for determining a level of the gate signal, and may output the gate power voltage to the gate driver 300. The power voltage generator 600 may generate a first gate power voltage VGH for determining a high level of the gate signal, and a second gate power voltage VGL for determining a low level of the gate signal. The power voltage generator 600 may output the first gate power voltage VGH and the second gate power voltage VGL to the gate driver 300. As described in more detail below, in some embodiments, the power voltage generator 600 may vary a level of the gate power voltage (e.g. VGH and/or VGL) based on a compensation duty ratio BD received from the driving controller 200.

Figure 2:
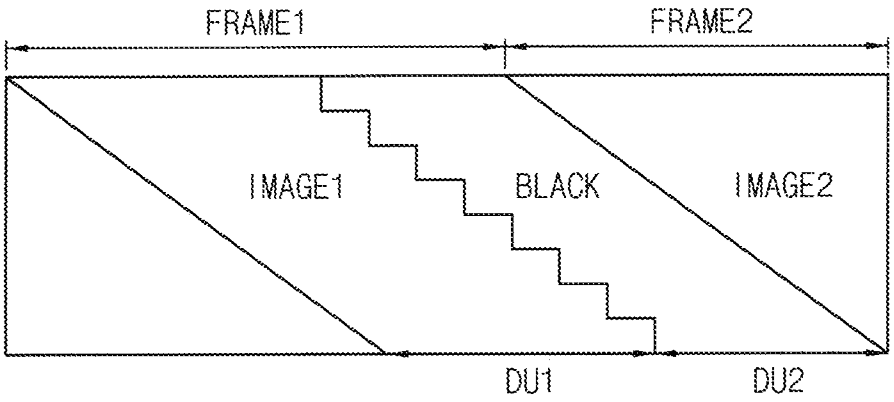
FIG. 2 is a conceptual diagram illustrating image frames of an image displayed on a display panel of FIG. 1.

FIG. 2 is a conceptual diagram illustrating image frames of an image displayed on the display panel 100 of FIG. 1.

Referring to FIGS. 1 and 2, the display panel 100 displays an image in a unit of a frame. The display panel 100 displays a first frame image in a first frame FRAME1, and a second frame image different from the first frame image in a second frame FRAME2.

In the present example embodiment, the display panel 100 may display normal images IMAGE1 and IMAGE2, and a compensation image BLACK. The normal images IMAGE1 and IMAGE2 may be displayed based on grayscale data of the input image data IMG. On the other hand, the compensation image BLACK may be displayed regardless of the grayscale data of the input image data IMG.

The compensation image BLACK may be inserted between the normal images IMAGE1 and IMAGE2 so that an image drag due to an instantaneous afterimage, which may occur due to a moving picture response time, may be prevented or substantially prevented. For example, the compensation image BLACK may be a low luminance image. For example, the compensation image BLACK may be a black image.

The power voltage generator 600 may vary a level of the gate power voltage (e.g. VGH and/or VGL) based on a compensation duty ratio BD determined based on a ratio between a display duration DU1 of the normal image IMAGE1 and a display duration DU2 of the compensation image BLACK. For example, the compensation duty ratio BD may refer to a ratio of the display duration DU2 of the compensation image BLACK to a sum (e.g., DU1+DU2) of the display duration DU1 of the normal image IMAGE1 and the display duration DU2 of the compensation image BLACK.

Figure 3:
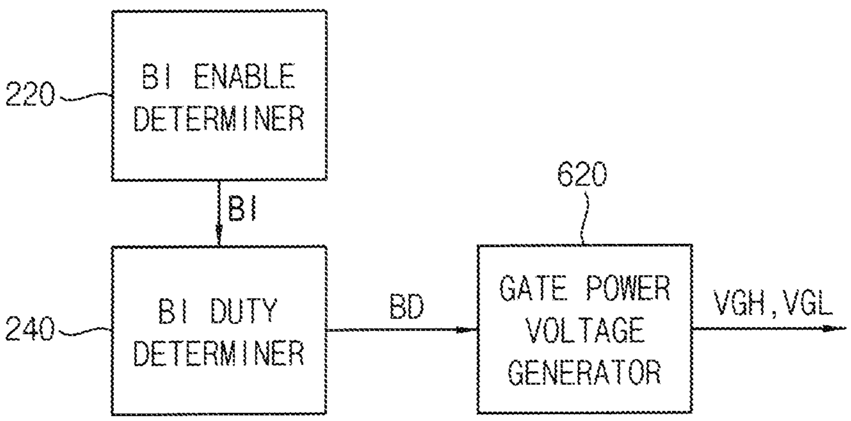
FIG. 3 is a block diagram illustrating a driving controller of FIG. 1.

FIG. 3 is a block diagram illustrating the driving controller 200 of FIG. 1 in more detail.

Referring to FIGS. 1 to 3, the driving controller 200 may include a compensation image insertion enable determiner (e.g., a BI enable determiner) 220, and a compensation duty ratio determiner (e.g., a BI duty determiner) 240. The compensation image insertion enable determiner 220 may enable and disable the compensation image insertion. For example, the compensation image insertion enable determiner 220 may generate a compensation image insertion signal BI having an enable level when the compensation image BLACK is to be inserted (e.g., when consecutive images to be displayed are moving images), and may provide the compensation image insertion signal BI to the compensation duty ratio determiner 240. When the compensation image insertion signal BI is enabled, the compensation duty ratio determiner 240 may determine the compensation duty ratio BD, and may output the compensation duty ratio BD to the power voltage generator 600. The driving controller 200 may determine to insert the compensation image BLACK between the normal images or not based on the input image data IMG. When the driving controller 200 determines that the input image data IMG causes the image drag due to the instantaneous afterimage, the driving controller 200 may determine to insert the compensation image BLACK between the normal images. Alternatively, it is determined to insert the compensation image BLACK between the normal images or not by user settings.

For example, the compensation duty ratio determiner 240 may output the compensation duty ratio BD to a gate power voltage generator 620 of the power voltage generator 600.

The gate power voltage generator 620 may vary a level of the gate power voltage (e.g. VGH and/or VGL) based on the compensation duty ratio BD.

Figure 4:
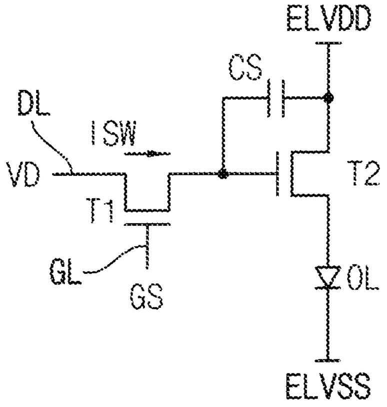
FIG. 4 is a circuit diagram illustrating an example of a pixel of the display panel of FIG. 1.
Figure 5:
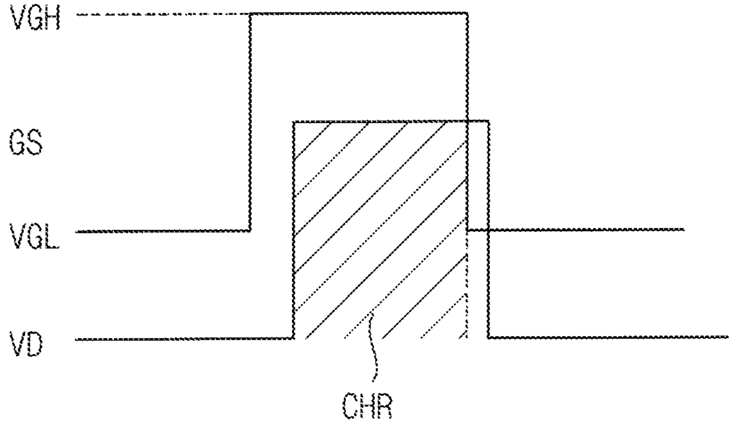
FIG. 5 is a conceptual diagram illustrating a charging rate of a data voltage charged at a pixel of FIG. 1.

FIG. 4 is a circuit diagram illustrating an example of the pixel P of the display panel 100 of FIG. 1. FIG. 5 is a conceptual diagram illustrating a charging rate of a data voltage VD charged at the pixel P of FIG. 1.

Referring to FIGS. 1 to 5, the pixel P includes a first pixel switching element (e.g., a first pixel switching transistor) T1, a second pixel switching element (e.g., a second pixel switching transistor) T2, a storage capacitor CS, and the organic light emitting element (e.g., an organic light emitting diode) OLED.

The first pixel switching element T1 may be a thin film transistor. The first pixel switching element T1 includes a control electrode connected to the gate line GL, an input electrode connected to the data line DL, and an output electrode connected to a control electrode of the second pixel switching element T2.

The control electrode of the first pixel switching element T1 may be a gate electrode. The input electrode of the first pixel switching element T1 may be a source electrode. The output electrode of the first pixel switching element T1 may be a drain electrode.

The second pixel switching element T2 may be a thin film transistor. The second pixel switching element T2 includes a control electrode connected to the output electrode of the first pixel switching element T1, an input electrode to which the first pixel power voltage ELVDD is applied, and an output electrode connected to a first electrode of the organic light emitting element OLED.

The control electrode of the second pixel switching element T2 may be a gate electrode. The input electrode of the second pixel switching element T2 may be a source electrode. The output electrode of the second pixel switching element T2 may be a drain electrode.

A first end of the storage capacitor CS is connected to the input electrode of the second pixel switching element T2. A second end of the storage capacitor CS is connected to the output electrode of the first pixel switching element T1.

The first electrode of the organic light emitting element OLED is connected to the output electrode of the second pixel switching element T2. The second pixel power voltage ELVSS is applied to the second electrode of the organic light emitting element OLED.

The first electrode of the organic light emitting element OLED may be an anode electrode. The second electrode of the organic light emitting element OLED may be a cathode electrode.

The pixel P receives the gate signal GS, the data voltage VD, the first pixel power voltage ELVDD, and the second pixel power voltage ELVSS, and may emit the organic light emitting element OLED having a luminance corresponding to the data voltage VD to display an image.

When a charging rate of the data voltage VD is insufficient, the organic light emitting element OLED may not display an image with a desired luminance. For example, when the compensation image BLACK is inserted between the normal images IMAGE1 and IMAGE2 to reduce the instantaneous afterimage due to the moving picture response time, the charging rate of the normal image IMAGE1 may not be sufficient.

As shown in FIG. 5, the charging rate CHR of the data voltage VD may be determined based on a waveform of a pulse of the gate signal GS, a waveform of a pulse of the data voltage VD, a timing of the pulse of the gate signal GS, and a timing of the pulse of the data voltage VD. In FIG. 5, the charging rate CHR of the data voltage VD may be represented as an overlapped portion of the pulse of the gate signal GS and the pulse of the data voltage VD.

Figure 6:
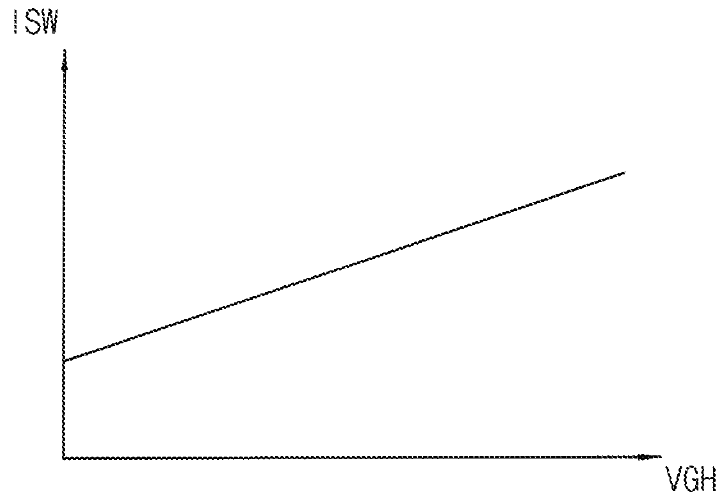
FIG. 6 is a graph illustrating a current of a switching element of FIG. 4 according to a first gate power voltage.
Figure 7:
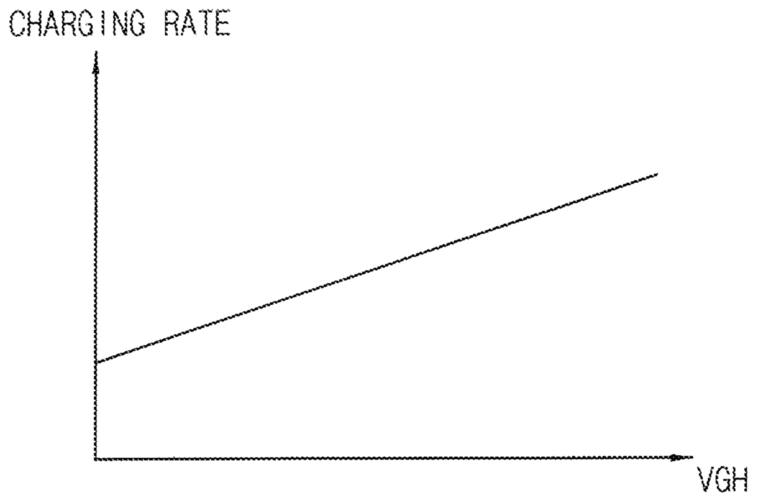
FIG. 7 is a graph illustrating a charging rate of a data voltage charged at the pixel of FIG. 1 according to the first gate power voltage.
Figure 8:
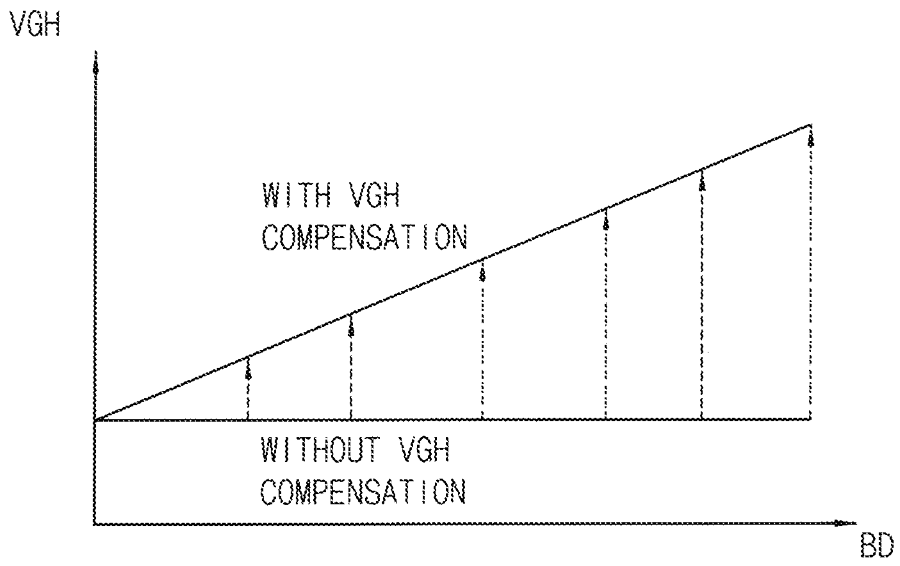
FIG. 8 is a graph illustrating the first gate power voltage according to a compensation duty ratio determined by a compensation duty ratio determiner of FIG. 3.
Figure 9:
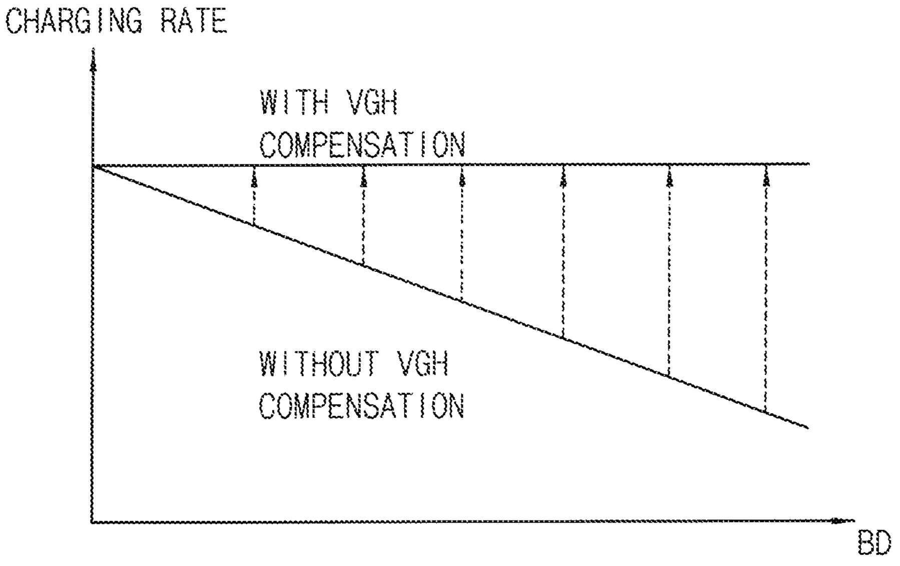
FIG. 9 is a graph illustrating a charging rate of a data voltage charged at the pixel of FIG. 1 according to the compensation of the first gate power voltage in FIG. 8.

FIG. 6 is a graph illustrating a current ISW of the switching element of FIG. 4 according to the first gate power voltage VGH. FIG. 7 is a graph illustrating the charging rate of the data voltage VD charged at the pixel P of FIG. 1 according to the first gate power voltage VGH. FIG. 8 is a graph illustrating the first gate power voltage VGH according to the compensation duty ratio BD determined by the compensation duty ratio determiner 240 of FIG. 3. FIG. 9 is a graph illustrating the charging rate of the data voltage VD charged at the pixel P of FIG. 1 according to the compensation of the first gate power voltage VGH in FIG. 8.

Referring to FIGS. 1 to 9, in the present example embodiment, the gate power voltage generator 620 may vary the first gate power voltage VGH based on the compensation duty ratio BD. For example, in some embodiments, as the compensation duty ratio BD increases, the gate power voltage generator 620 may increase the first gate power voltage VGH.

As shown in FIGS. 4, 5 and 6, when the first gate power voltage VGH increases, a switching transistor current ISW flowing through the input electrode and the output electrode of the first pixel transistor T1 increases.

Thus, as shown in FIG. 7, when the first gate power voltage VGH increases, the charging rate of the data voltage VD may increase.

Generally, when the compensation duty ratio BD increases, the charging time of the data voltage VD decreases so that the charging rate of the data voltage VD may be reduced (e.g., without VGH compensation). Accordingly, as shown in FIG. 8, when the compensation duty ratio BD increases, the gate power voltage generator 620 may increase the first gate power voltage VGH (e.g., with VGH compensation). Thus, as shown in FIG. 9, the charging rate of the data voltage VD may be compensated due to the increase of the first gate power voltage VGH (e.g., with VGH compensation).

Figure 10:
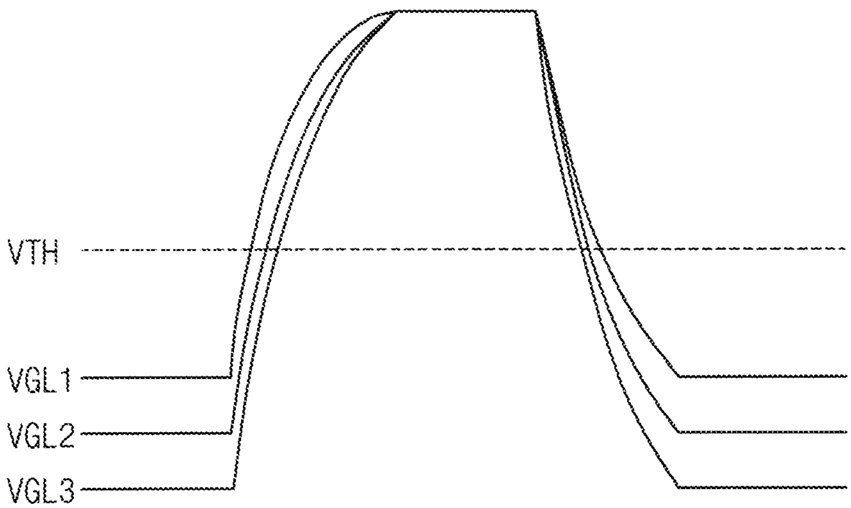
FIG. 10 is a graph illustrating a waveform of a gate signal applied to the pixel of FIG. 1 according to a second gate power voltage.
Figure 11:
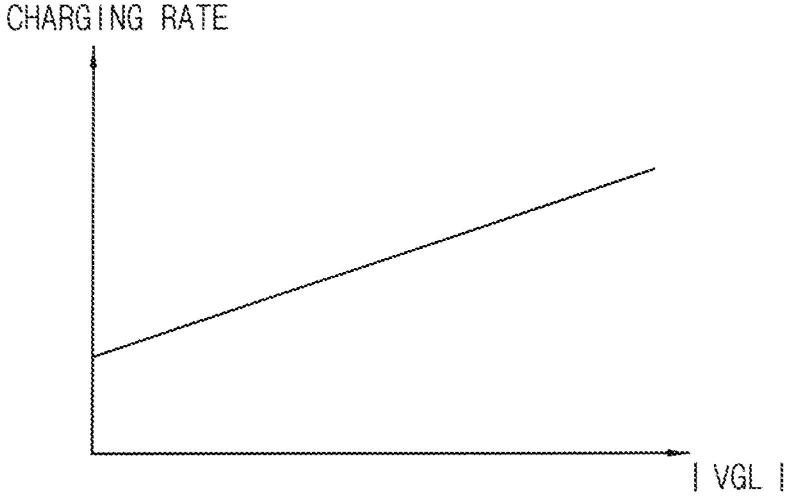
FIG. 11 is a graph illustrating a charging rate of a data voltage charged at the pixel of FIG. 1 according to the second gate power voltage.
Figure 12:
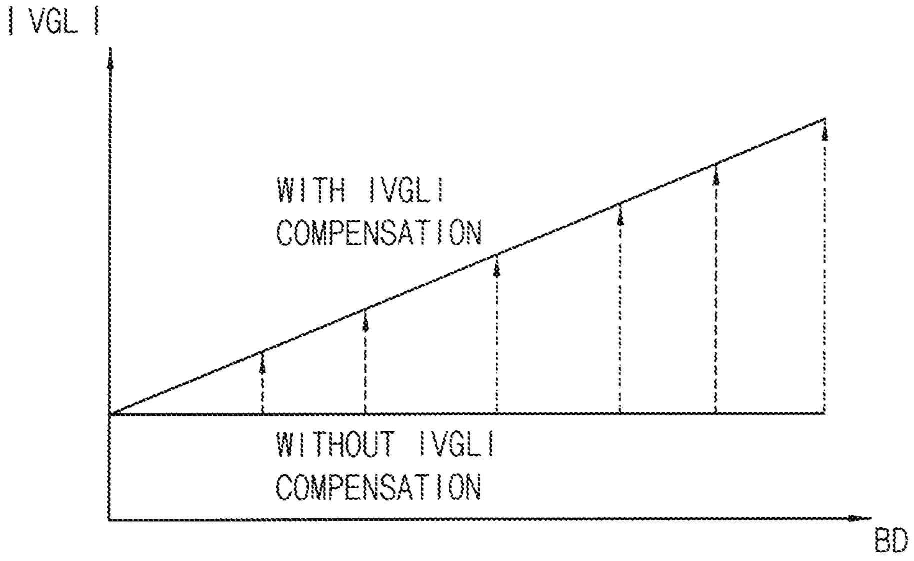
FIG. 12 is a graph illustrating a second gate power voltage according to the compensation duty ratio determined by the compensation duty ratio determiner of FIG. 3.
Figure 13:
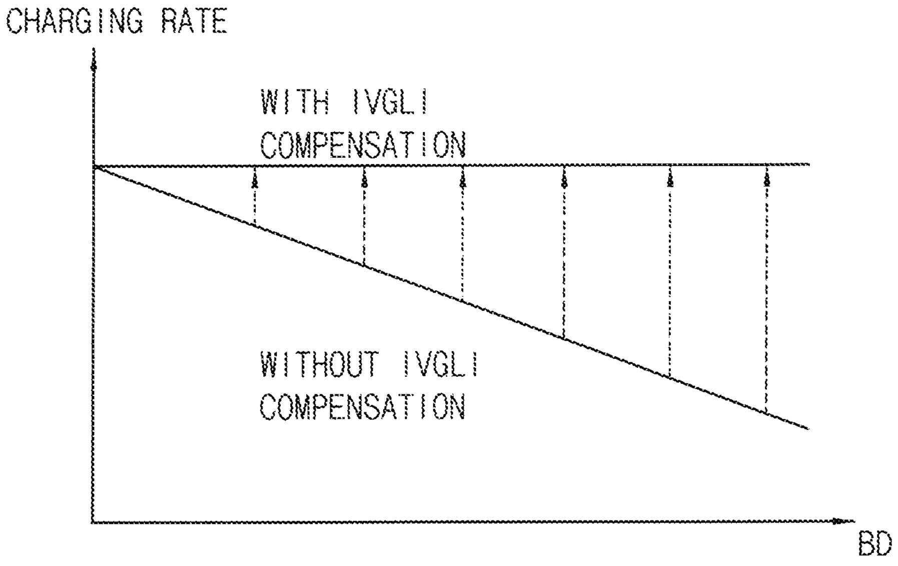
FIG. 13 is a graph illustrating a charging rate of a data voltage charged at the pixel of FIG. 1 according to the compensation of the second gate power voltage in FIG. 12.

FIG. 10 is a graph illustrating a waveform of a gate signal GS applied to the pixel P of FIG. 1 according to the second gate power voltage VGL. FIG. 11 is a graph illustrating the charging rate of the data voltage VD charged at the pixel P of FIG. 1 according to the second gate power voltage VGL. FIG. 12 is a graph illustrating the second gate power voltage VGL according to the compensation duty ratio BD determined by the compensation duty ratio determiner 240 of FIG. 3. FIG. 13 is a graph illustrating the charging rate of the data voltage VD charged at the pixel P of FIG. 1 according to the compensation of the second gate power voltage VGL in FIG. 12.

Referring to FIGS. 1 to 5 and 10 to 13, in the present example embodiment, the gate power voltage generator 620 may vary the second gate power voltage VGL based on the compensation duty ratio BD. For example, in some embodiments, as the compensation duty ratio BD increases, the gate power voltage generator 620 may decrease the second gate power voltage VGL. When a polarity of the second gate power voltage VGL is defined as a negative polarity, as the compensation duty ratio BD increases, the gate power voltage generator 620 may increase an absolute value |VGL| of the second gate power voltage VGL.

As shown in FIG. 10, as the second gate power voltage VGL decreases, the falling time of the waveform of the gate signal GS may decrease. A second falling time of the gate signal GS when the gate signal GS decreases from a high level to a second level VGL2 may be shorter than a first falling time of the gate signal GS when the gate signal GS decreases from the high level to a first level VGL1. A third falling time of the gate signal GS when the gate signal GS decreases from the high level to a third level VGL3 may be shorter than the second falling time of the gate signal GS when the gate signal GS decreases from the high level to the second level VGL2.

When the falling time of the waveform of the gate signal GS is shorter, the gate signal GS may be decreased lower than a threshold voltage VTH of the first pixel transistor T1 faster so that the switching characteristics of the first pixel transistor T1 may be enhanced. When the switching characteristics of the first pixel transistor are enhanced, the charging rate of the data voltage VD may increase.

Generally, when the compensation duty ratio BD increases, the charging time of the data voltage VD decreases so that the charging rate of the data voltage VD may be reduced (e.g., without |VGL| compensation). Accordingly, as shown in FIG. 12, when the compensation duty ratio BD increases, the gate power voltage generator 620 may decrease the second gate power voltage VGL or may increase the absolute |VGL| of the second gate power voltage (e.g., with |VGL| compensation). Thus, as shown in FIG. 13, the charging rate of the data voltage VD may be compensated due to the decrease of the second gate power voltage VGL or the increase of the absolute value |VGL| of the second gate power voltage (e.g., with |VGL| compensation).

As described with reference to FIGS. 5 to 9, in some embodiments, the power voltage generator 600 may vary the level of the first gate power voltage VGH according to the compensation duty ratio BD. As described with reference to FIGS. 10 to 13, in some embodiments, the power voltage generator 600 may vary the level of the second gate power voltage VGL according to the compensation duty ratio BD. In an example embodiment, the power voltage generator 600 may vary both the levels of the first gate power voltage VGH and the second gate power voltage VGL according to the compensation duty ratio BD.

According to the present example embodiment, the compensation image BLACK is inserted between the normal images IMAGE1 and IMAGE2 so that an image drag due to an instantaneous afterimage, which may occur due to a moving picture response time, may be prevented or substantially prevented.

In addition, the gate power voltage (VGH and/or VGL) is varied based on the duty ratio BD of the compensation image BLACK so that the decrease of the charging rate of the normal image IMAGE1 and the display defect due to the decrease of the charging rate may be prevented or substantially prevented when the compensation image BLACK is inserted between the normal images IMAGE1 and IMAGE2. The charging rate of the normal image IMAGE1 is compensated so that the display quality of the display panel 100 may be enhanced.

Figure 14:
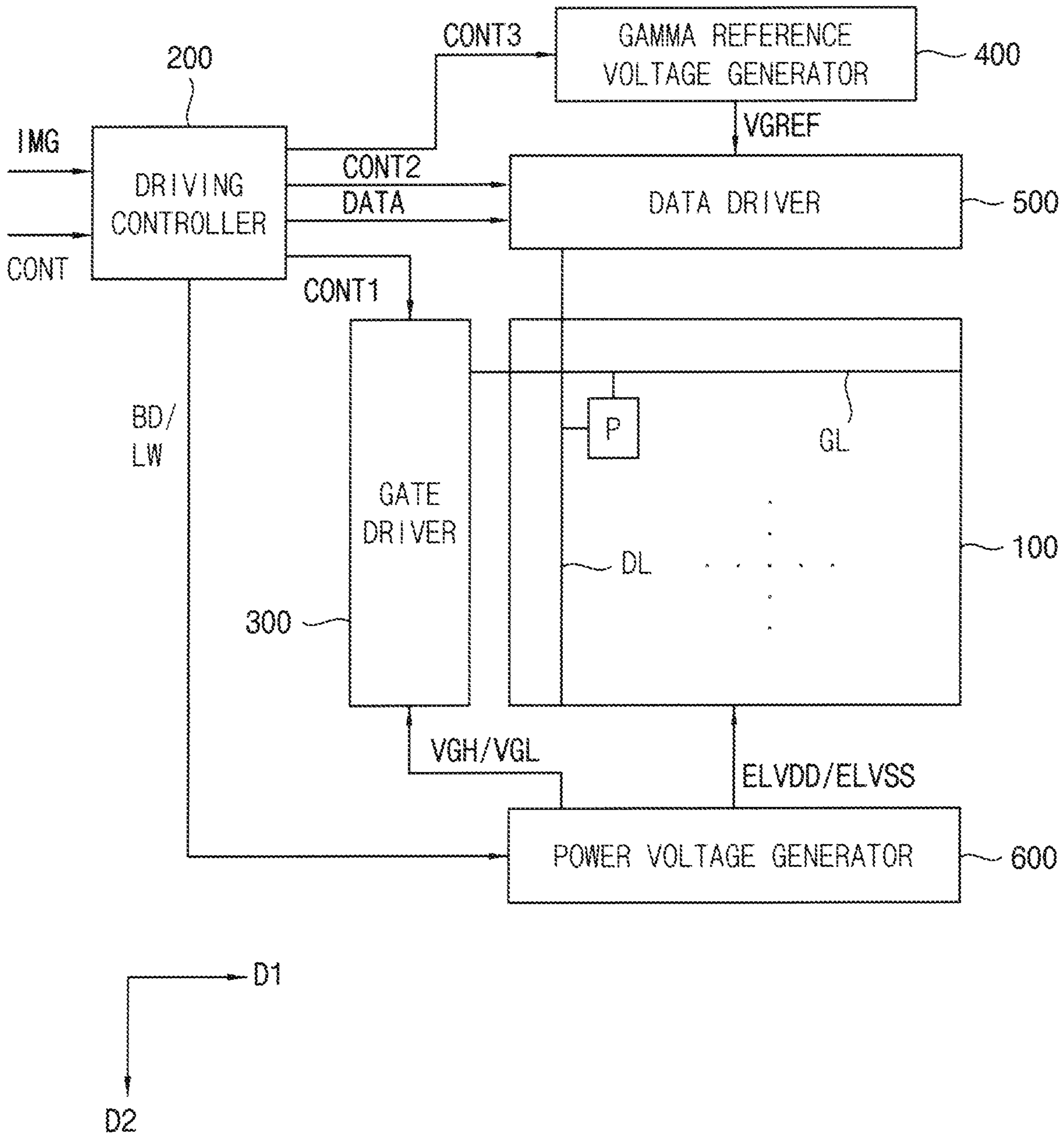
FIG. 14 is a block diagram illustrating a display apparatus according to an example embodiment of the present disclosure.
Figure 15:
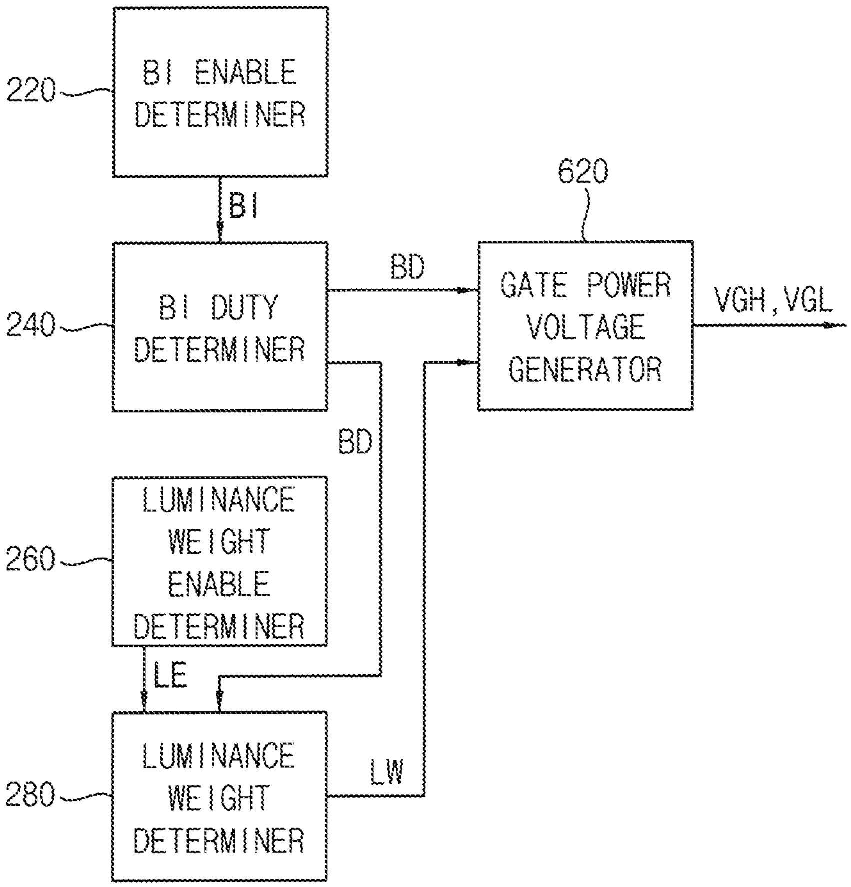
FIG. 15 is a block diagram illustrating a driving controller of FIG. 14.

FIG. 14 is a block diagram illustrating a display apparatus according to an example embodiment of the present disclosure. FIG. 15 is a block diagram illustrating a driving controller 200 of FIG. 14;

The display apparatus and the method of driving the display panel according to the present example embodiment is the same or substantially the same as the display apparatus and the method of driving the display panel described with reference to FIGS. 1 to 13, except for the structures of the driving controller 200 and the power voltage generator 600, and the operations of the driving controller 200 and the power voltage generator 600. Thus, the same reference numerals will be used to refer to the same or substantially the same elements or parts (e.g., like or similar elements or parts) as those described in the embodiments of FIGS. 1 to 13, and redundant description thereof may not be repeated.

Referring to FIGS. 2 and 4 to 15, the display apparatus includes a display panel 100, and a display panel driver. The display panel driver includes a driving controller (e.g., a timing controller) 200, a gate driver (e.g., a scan driver) 300, a gamma reference voltage generator 400, and a data driver 500. The display panel driver further includes a power voltage generator 600.

In the present example embodiment, the display panel 100 may display normal images IMAGE1 and IMAGE2, and a compensation image BLACK. The normal images IMAGE1 and IMAGE2 may be displayed based on grayscale data of the input image data IMG. On the other hand, the compensation image BLACK may be displayed regardless of the grayscale data of the input image data IMG.

The power voltage generator 600 may vary the level of the gate power voltage (e.g. VGH and/or VGL) based on the compensation duty ratio BD determined based on a ratio between a display duration DU1 of the normal image IMAGE1 and a display duration DU2 of the compensation image BLACK. In addition, the power voltage generator 600 may vary the level of the gate power voltage (e.g. VGH and/or VGL) based on a luminance weight LW for varying a luminance of the input image data IMG according to the compensation duty ratio BD. Herein, the compensation duty ratio BD may refer to a ratio of the display duration DU2 of the compensation image BLACK to a sum (e.g., DU1+DU2) of the display duration DUI of the normal image IMAGE1 and the display duration DU2 of the compensation image BLACK. The luminance weight LW may be a gain multiplied to the input image data IMG to increase the luminance of the image. For example, when the luminance weight LW is 1.2, the input image data IMG may be increased by 20%.

The driving controller 200 may include a compensation image insertion enable determiner (e.g., a BI enable determiner) 220, and a compensation duty ratio determiner (e.g., a BI duty determiner) 240. The compensation image insertion enable determiner 220 may enable and disable the compensation image insertion. For example, the compensation image insertion enable determiner 220 may generate a compensation image insertion signal BI having an enable level when the compensation image BLACK is to be inserted (e.g., when consecutive images to be displayed are moving images), and may provide the compensation image insertion signal BI to the compensation duty ratio determiner 240. When the compensation image insertion signal BI is enabled, the compensation duty ratio determiner 240 may determine the compensation duty ratio BD, and may output the compensation duty ratio BD to the power voltage generator 600 (e.g., to the gate power voltage generator 620).

In the present example embodiment, the driving controller 200 may further include a luminance weight enable determiner 260 and a luminance weight determiner 280. The luminance weight enable determiner 260 may enable and disable the applying of the luminance weight LW. For example, the luminance weight enable determiner 260 may generate a luminance weight enable signal LE having an enable level when the luminance weight LW is to be applied (e.g., when a luminance amount of the image to be displayed exceeds a threshold value) according to the compensation duty ratio BD, and may provide the luminance weight enable signal LE to the luminance weight determiner 280. When the luminance weight enable signal LE is enabled, the luminance weight determiner 280 may determine the luminance weight LW, and may output the luminance weight LW to the power voltage generator 600. The driving controller 200 may determine to apply the luminance weight LW or not based on the compensation duty ratio BD. Alternatively, it is determined to apply the luminance weight LW or not by user settings.

The compensation duty ratio determiner 240 may output the compensation duty ratio BD to the gate power voltage generator 620 of the power voltage generator 600. The luminance weight determiner 280 may output the luminance weight LW to the gate power voltage generator 620 of the power voltage generator 600.

The gate power voltage generator 620 may vary a level of the gate power voltage (e.g. VGH and/or VGL) based on the compensation duty ratio BD and the luminance weight LW.

When the charging rate of the data voltage VD is insufficient, the organic light emitting element OLED may not display an image having a desired luminance. For example, when the compensation image BLACK is inserted between the normal images IMAGE1 and IMAGE2 to reduce the instantaneous afterimage due to the moving picture response time, the charging rate of the normal image IMAGE1 may not be sufficient.

When the compensation duty ratio BD increases, the luminance weight LW may increase. To compensate the decrease of the charging rate due to the compensation duty ratio BD, the driving controller 200 may amplify a luminance of the input image data IMG using the luminance weight LW.

However, when the level of the data voltage VD increases due to the increase of the luminance weight LW, a rising time of the waveform of the data voltage VD may increase due to the increase of the level of the data voltage VD. Accordingly, the desired data voltage VD may not be sufficiently charged. Thus, when the applying of the luminance weight LW is enabled, an additional compensation of the gate power voltage (e.g. VGH and/or VGL) may be desired.

Figure 16:
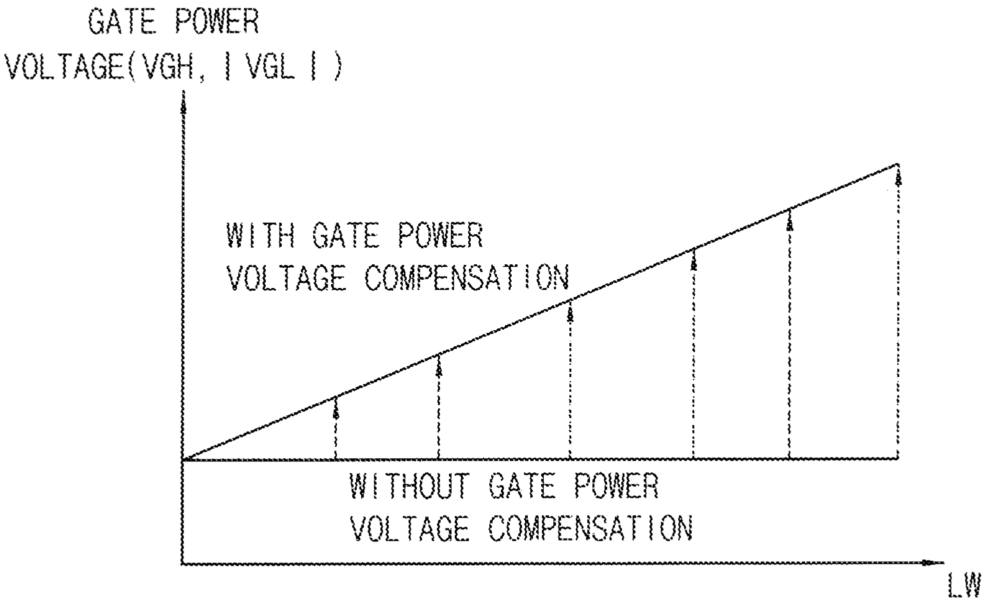
FIG. 16 is a graph illustrating a gate power voltage according to a luminance weight determined by a luminance weight determiner of FIG. 15.
Figure 17:
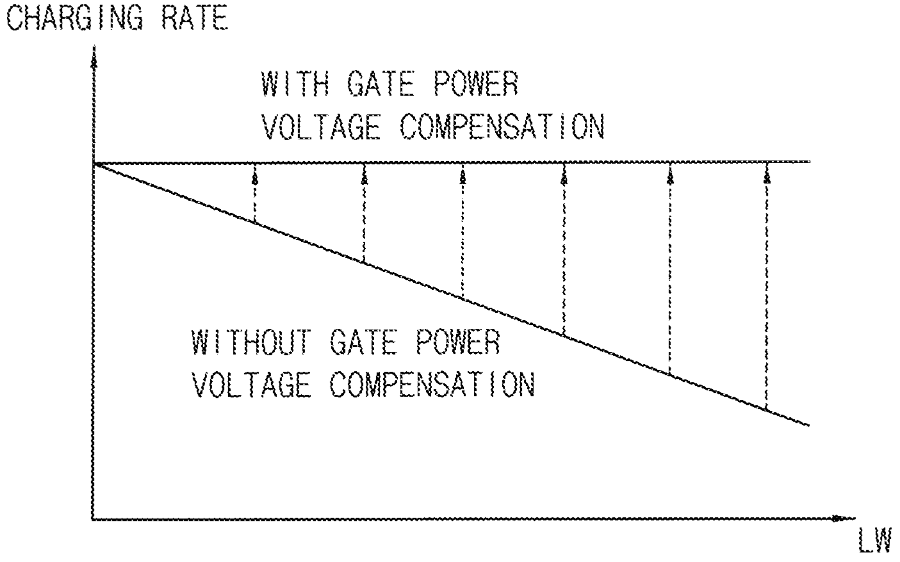
FIG. 17 is a graph illustrating a charging rate of a data voltage charged at the pixel according to the compensation of the gate power voltage in FIG. 16.

FIG. 16 is a graph illustrating the gate power voltage (e.g. VGH and/or VGL) according to the luminance weight LW determined by the luminance weight determiner 280 of FIG. 15. FIG. 17 is a graph illustrating the charging rate of the data voltage VD charged at the pixel P according to the compensation of the gate power voltage (e.g. VGH and/or VGL) in FIG. 16.

Referring to FIGS. 2 and 4 to 17, generally, when the luminance weight LW increases, the charging load of the data voltage VD increases so that the desired charging rate of the data voltage VD may not be guaranteed (e.g., without gate power voltage compensation). Accordingly, as shown in FIG. 16, when the luminance weight LW increases, the gate power voltage generator 620 may increase the first gate power voltage VGH and/or may decrease the second gate power voltage VGL (or increase the absolute value |VGL| of the second gate power voltage) (e.g., with gate power voltage compensation). Thus, as shown in FIG. 17, the charging rate of the data voltage VD may be compensated due to the increase of the first gate power voltage VGH and/or the decrease of the second gate power voltage VGL (e.g., with gate power voltage compensation).

The power voltage generator 600 of the present example embodiment in FIGS. 16 and 17 may selectively vary one of the level of the first gate power voltage VGH or the level of the second gate power voltage VGL. In other embodiments, the power voltage generator 600 of the present example embodiment in FIGS. 16 and 17 may vary both the levels of the first gate power voltage VGH and the second gate power voltage VGL.

Figure 18:
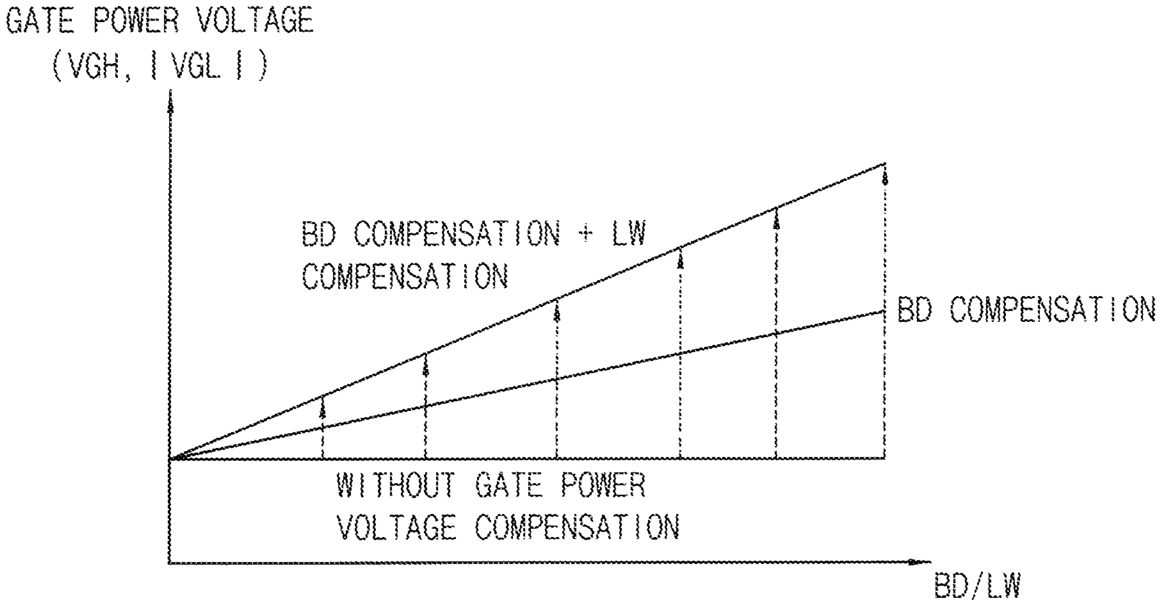
FIG. 18 is a graph illustrating a gate power voltage according to a compensation duty ratio determined by a compensation duty ratio determiner of FIG. 15 and a luminance weight determined by a luminance weight determiner of FIG. 15.
Figure 19:
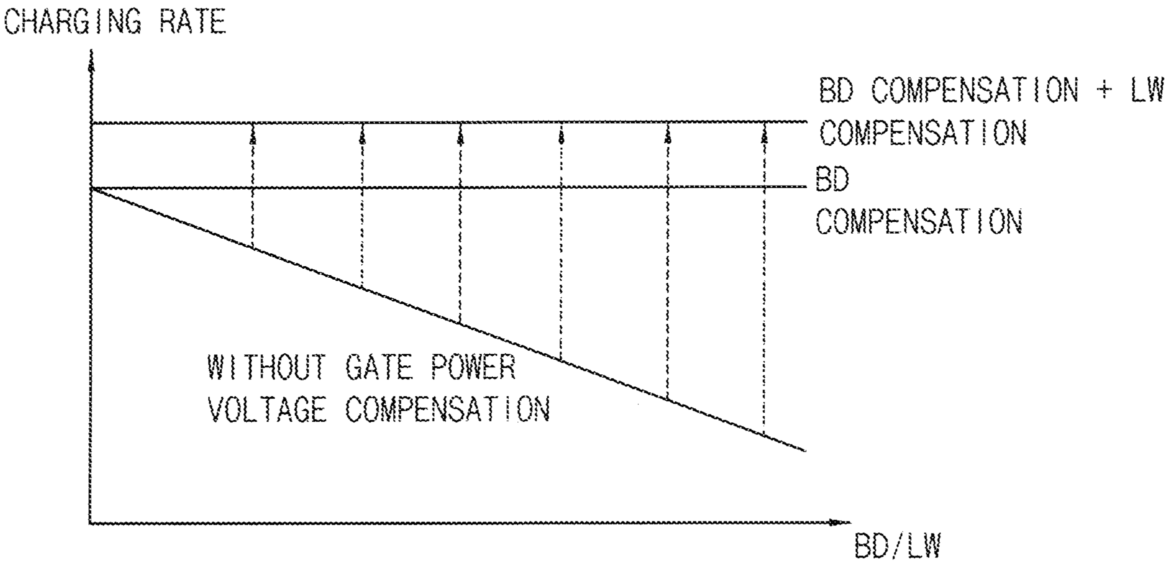
FIG. 19 is a graph illustrating a charging rate of a data voltage charged at the pixel according to the compensation of the gate power voltage in FIG. 18.

FIG. 18 is a graph illustrating the gate power voltage (e.g. VGH and/or VGL) according to the compensation duty ratio BD determined by the compensation duty ratio determiner 240 and the luminance weight LW determined by the luminance weight determiner 280 of FIG. 15. FIG. 19 is a graph illustrating the charging rate of the data voltage VD charged at the pixel P according to the compensation of the gate power voltage (e.g. VGH and/or VGL) in FIG. 18.

Referring to FIGS. 2 and 4 to 19, when the compensation duty ratio BD increases, the gate power voltage generator 620 may increase the level of the first gate power voltage VGH. When the luminance weight LW increases, the gate power voltage generator 620 may increase the level of the first gate power voltage VGH.

When the compensation duty ratio BD increases, the gate power voltage generator 620 may decrease the level of the second gate power voltage VGL (or increase the absolute value |VGL| of the level of the second gate power voltage). When the luminance weight LW increases, the gate power voltage generator 620 may decrease the level of the second gate power voltage VGL (or increase the absolute value |VGL| of the level of the second gate power voltage).

As shown in FIGS. 18 and 19, when the gate power voltage (e.g. VGH and/or VGL) is compensated based on the compensation duty ratio BD and the luminance weight LW, the charging rate of the data voltage VD may further increase when compared to the case where the gate power voltage (e.g. VGH and/or VGL) is compensated only based on the compensation duty ratio BD.

According to the present example embodiment, the compensation image BLACK is inserted between the normal images IMAGE1 and IMAGE2 so that an image drag due to an instantaneous afterimage, which may occur due to a moving picture response time, may be prevented or substantially prevented.

In addition, the gate power voltage (e.g., VGH and/or VGL) is varied based on the duty ratio BD of the compensation image BLACK and the luminance weight LW so that the decrease of the charging rate of the normal image IMAGE1 and the display defect due to the decrease of the charging rate may be prevented or substantially prevented when the compensation image BLACK is inserted between the normal images IMAGE1 and IMAGE2. The charging rate of the normal image IMAGE1 is compensated so that the display quality of the display panel 100 may be enhanced.

According to one or more example embodiments of the present disclosure described above, the display quality of the display panel may be enhanced.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. In the claims, means-plus-function clauses, if any, are intended to cover the structures described herein as performing the recited function, and not only structural equivalents, but also equivalent structures. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A display apparatus comprising:
- a display panel comprising:
  - a gate line;
  - a data line; and
  - a pixel electrically connected to the gate line and the data line, and
- configured to display a normal image and a compensation image in a first image frame;
- a gate driver configured to output a gate signal to the gate line;
- a data driver configured to output a data voltage to the data line; and
- a power voltage generator configured to vary a level of a gate power voltage based on a compensation duty ratio corresponding to a ratio between a display duration of the normal image and a display duration of the compensation image of the first image frame,
- wherein a level of at least one of a high voltage or a low voltage of the gate signal is adjusted based on the level of the gate power voltage to compensate for a change in a charge rate of the data voltage to the pixel,
- wherein the display apparatus further comprises a driving controller configured to control an operation of the gate driver and an operation of the data driver, and
- wherein the driving controller comprises:
  - a compensation image insertion enable determiner configured to enable and disable a compensation image insertion; and
  - a compensation duty ratio determiner configured to determine the compensation duty ratio, and output the compensation duty ratio to the power voltage generator, when the compensation image insertion is enabled.

2. The display apparatus of claim 1, wherein the gate power voltage is a first gate power voltage corresponding to a high level of the gate signal.

3. The display apparatus of claim 2, wherein the compensation duty ratio is a ratio of the display duration of the compensation image to a sum of the display duration of the normal image and the display duration of the compensation image, and wherein the power voltage generator is configured to increase the first gate power voltage as the compensation duty ratio increases.

4. The display apparatus of claim 1, wherein the gate power voltage is a second gate power voltage corresponding to a low level of the gate signal.

5. The display apparatus of claim 4, wherein the compensation duty ratio is a ratio of the display duration of the compensation image to a sum of the display duration of the normal image and the display duration of the compensation image, and wherein the power voltage generator is configured to decrease the second gate power voltage as the compensation duty ratio increases.

6. The display apparatus of claim 1, wherein the normal image is displayed based on grayscale data of input image data, and wherein the compensation image is displayed regardless of the grayscale data of the input image data.

7. The display apparatus of claim 6, wherein the compensation image is a black image.

8. The display apparatus of claim 1, wherein the power voltage generator is configured to vary the level of the gate power voltage based on the compensation duty ratio and a luminance weight for varying a luminance of input image data according to the compensation duty ratio.

9. The display apparatus of claim 8, wherein the luminance weight is increased when the compensation duty ratio increases.

10. The display apparatus of claim 8, wherein the gate power voltage is a first gate power voltage corresponding to a high level of the gate signal.

11. The display apparatus of claim 10, wherein the compensation duty ratio is a ratio of the display duration of the compensation image to a sum of the display duration of the normal image and the display duration of the compensation image, wherein the power voltage generator is configured to increase the first gate power voltage as the compensation duty ratio increases, and wherein the power voltage generator is configured to increase the first gate power voltage as the luminance weight increases.

12. The display apparatus of claim 8, wherein the gate power voltage is a second gate power voltage corresponding to a low level of the gate signal.

13. The display apparatus of claim 12, wherein the compensation duty ratio is a ratio of the display duration of the compensation image to a sum of the display duration of the normal image and the display duration of the compensation image, wherein the power voltage generator is configured to decrease the second gate power voltage as the compensation duty ratio increases, and wherein the power voltage generator is configured to decrease the second gate power voltage as the luminance weight increases.

14. The display apparatus of claim 8, wherein the driving controller further comprises:

a luminance weight enable determiner configured to enable and disable applying of the luminance weight; and a luminance weight determiner configured to determine the luminance weight, and output the luminance weight to the power voltage generator, when the applying of the luminance weight is enabled.

15. A method of driving a display panel, the method comprising:

determining a level of a gate power voltage based on a compensation duty ratio corresponding to a ratio between a display duration of a normal image and a display duration of a compensation image of a first image frame;

generating a gate signal based on the gate power voltage;

outputting the gate signal to a gate line; and outputting a data voltage to a data line based on input image data, wherein a level of at least one of a high voltage or a low voltage of the gate signal is adjusted based on the level of the gate power voltage to compensate for a change in a charge rate of the data voltage to a pixel, wherein a driving controller is configured to control the outputting of the gate signal to the gate line and the outputting of the data voltage to the data line, and wherein the driving controller comprises:

a compensation image insertion enable determiner configured to enable and disable a compensation image insertion; and a compensation duty ratio determiner configured to determine the compensation duty ratio, and output the compensation duty ratio to a power voltage generator to determine the level of the gate power voltage, when the compensation image insertion is enabled.

16. The method of claim 15, wherein the gate power voltage is a first gate power voltage corresponding to a high level of the gate signal, wherein the compensation duty ratio is a ratio of the display duration of the compensation image to a sum of the display duration of the normal image and the display duration of the compensation image, and wherein the first gate power voltage is increased as the compensation duty ratio increases.

17. The method of claim 15, wherein the gate power voltage is a second gate power voltage corresponding to a low level of the gate signal, wherein the compensation duty ratio is a ratio of the display duration of the compensation image to a sum of the display duration of the normal image and the display duration of the compensation image, and wherein the second gate power voltage is decreased as the compensation duty ratio increases.

18. The method of claim 15, wherein the normal image is displayed based on grayscale data of the input image data, and wherein the compensation image is displayed regardless of the grayscale data of the input image data.

19. The method of claim 15, wherein the level of the gate power voltage is determined based on the compensation duty ratio and a luminance weight for varying a luminance of the input image data according to the compensation duty ratio.

* * * * *